United States Patent [19]

Ganguli et al.

[11] Patent Number: 5,232,890

[45] Date of Patent: Aug. 3, 1993

[54] PRECIOUS METAL CATALYSTS WITH OXYGEN-ION CONDUCTING SUPPORT

[76] Inventors: Partha S. Ganguli, 69 Erdman Ave., Princeton, N.J. 08540; Sankaran Sundaresan, 652 Paxson Ave., Mercerville, N.J. 08619

[21] Appl. No.: 459,560

[22] Filed: Jan. 2, 1990

[51] Int. Cl.$^5$ .................. B01J 23/42; B01J 23/44; B01J 21/06

[52] U.S. Cl. ..................... 502/304; 502/332; 502/333; 502/334; 502/335; 502/439

[58] Field of Search ............... 502/332, 333, 334, 351, 502/303, 304, 439

[56] References Cited

U.S. PATENT DOCUMENTS

| | | | |
|---|---|---|---|
| 3,862,255 | 1/1975 | Bertus et al. | 585/622 |
| 4,384,934 | 5/1983 | de Bruin et al. | 204/426 |
| 4,659,448 | 4/1987 | Gordon | 204/428 |
| 4,789,454 | 12/1988 | Badwal et al. | 204/422 |
| 4,791,079 | 12/1988 | Hazbum | 502/324 |
| 4,822,760 | 4/1989 | Kashibe et al. | 502/24 |
| 4,827,071 | 5/1989 | Hazbum | 585/443 |
| 4,834,051 | 5/1989 | Tanaka et al. | 123/440 |
| 4,895,596 | 1/1990 | Imatani et al. | 502/24 |

*Primary Examiner*—Anthony McFarlane
*Attorney, Agent, or Firm*—Fred A. Wilson

[57] ABSTRACT

Three-way catalysts used for treatment of automobile exhaust gas or gas emissions from stationary combustion sources, which typically have consisted of platinum and rhodium and sometimes palladium and rhodium dispersed on an $\gamma$-alumina support, can have the activities of the active metals in the catalysts appreciably enhanced by using an oxygen-ion conducting material such as yttria-stabilized-zirconia (YSZ) as the support material. Support material surface area is 20-300 m$^2$/gm, and useful concentrations of yttria on zirconia support are 1.0-50 wt. %. Useful concentrations of platinum or palladium on the support material is 0.01-2 wt. %, and the weight ratio of rhodium/platinum or rhodium/palladium is 0.01-0.1. YSZ-supported catalysts can achieve a substantially higher level of pollutants (CO, NO$_X$, H$_2$ and hydrocarbons) removal, without requiring increased loading of expensive precious active metals on the support material.

12 Claims, No Drawings

PRECIOUS METAL CATALYSTS WITH OXYGEN-ION CONDUCTING SUPPORT

BACKGROUND OF INVENTION

This invention pertains to three-way precious metal catalysts which utilize an oxygen-ion conducting support material for simultaneous oxidation of carbon monoxide, hydrogen and hydrocarbon compounds and reduction of nitrogen oxides present in gas emissions from mobile or stationary fuel combustion sources, such as automotive exhaust gases or power plant gas emissions.

Supported metal catalysts are widely used for oxidation and reduction of pollutants present in gas exhausts or emissions from mobile or stationary internal combustion power generation sources. One approach to solving this gas emission problem by simultaneous oxidation of carbon monoxide and hydrocarbons and reduction of $NO_x$ compounds in exhaust gases is passing such gases through a single bed catalytic converter. The three-way catalyst used in the converter typically consists of platinum (Pt), rhodium (Rh) and sometimes palladium (Pd) deposited on a conventional $\gamma$-alumina ($Al_2O_3$) support material, which may be in either pellet or a monolithic form.

The existing precious metal catalysts for treatment of automotive exhaust gases typically uses alumina and sometimes ceria-stabilized $\gamma$-alumina or lanthanum oxide-stabilized $\gamma$-alumina as a support material. It is believed that the addition of ceria may promote the performance of the three-way catalyst by facilitating the water-gas shift reaction, by acting as an oxygen storage unit, and by stabilizing the gamma-alumina support against loss of surface area. But none of the known catalyst supports used for automobile exhaust gases treatment have provided any oxygen-ion conducting property. We have now found that use of an oxygen-ion conducting catalyst support material greatly improved the pollutant removal capability of previous metal catalysts without the need for increase in the catalyst active previous metal content, which makes the catalyst too costly.

SUMMARY OF INVENTION

This invention provides a highly active three-way precious metal catalyst having an oxygen-ion conducting support material and which is useful for effective removal of pollutants present in combustion gas emissions from mobile and stationary fuel combustion sources, such as from automobile engine exhaust gases. A three-way catalyst as defined by this invention provides three material surfaces consisting of two active metals and an oxygen-ion conducting support material for oxidation reactions with a pollutant gas containing carbon monoxide, hydrogen and hydrocarbon compounds The catalyst contains two active precious metals such as platinum and rhodium or palladium and rhodium dispersed on an oxygen-ion conducting support material, such as yttria-stabilized-zirconia (YSZ). If desired, the addition of cerium oxide or lanthanum oxide can also be used as a stabilizer for the support material. The support material has a surface area of at least about 20 $m^2/gm$, and preferably 40–300 $m^2/gm$. The concentration of yttria ($Y_2O_3$) on yttria-stabilized zirconia (YSZ) used as the support material can be in the range of 1.0 to 50 wt. %, and is preferably 6–20 wt. % of the support material. Alternatively, a conventional support material such as $\gamma$-alumina coated with yttria-stabilized-zirconia (YSZ) can also be used. The concentration of yttria-stabilized zirconia (YSZ) used as a coating on the conventional support material should be at least 0.1 wt. %, and is preferably 5–80 wt. % of the support material.

High surface area support material of yttria-stabilized-zirconia (YSZ) can be prepared by a sol-gel technique using alkoxides of the elements, or by a microemulsion technique using aqueous solutions of yttrium, zirconium and ammonium salts. Platinum or palladium active metal concentrations on the support material may vary between 0.01 to 2.0 wt. % of the catalyst. The rhodium/platinum (Rh/Pt) weight ratio or rhodium/palladium (Rh/Pd) weight ratio may vary between 0.01 to 0.1, so as to provide an active metals total concentration of 0.01 to 2.2 wt. %. The active metals platinum, palladium and rhodium can be deposited on the YSZ support material surface by using a known aqueous impregnation procedure. Useful shapes for the catalyst can include beads, extrudates, pellets, and monolithic molded shapes, such as honeycomb structures.

Because of the use of an oxygen-ion conducting support material in a three-way precious metal catalyst according to this invention, the catalyst is much more active towards simultaneous oxidation of CO, $H_2$ and hydrocarbons, and reduction of $NO_x$ than known catalysts utilizing conventional support material such as $\gamma$-alumina alone. This new catalyst material can advantageously achieve a substantially higher level of pollutants removal from automobile exhaust gases, or from gas emissions from stationary fuel combustion exhaust sources, without requiring an undesirable increase in the concentration or loading of active precious metals on the catalyst support material. This improved catalyst is useful for removal of known pollutants from exhaust gases from various fuel combustion processes, such as gas emission and pollutants from internal combustion engines, including gasoline and diesel automotive engines and gas turbines. Such gas pollutants also occur from stationary fuel combustion in power plants and from waste incineration installations, and from catalytic combustion of chemical effluents. Catalytic action using this three-way precious metal catalyst material on exhaust gases results in converting the pollutant compounds to essentially $CO_2$ $N_2$ and water vapor.

DESCRIPTION OF INVENTION

Supported active metal catalysts are widely used for various oxidation reactions, with the catalysts used for automotive engine exhaust gas after-treatment being a prime example. When known inert materials such as silica or alumina are used as catalyst supports, the oxidation reactions proceed only on the surface of the active metals or multimetallic crystallites, and these reactions can proceed on the active metal surface even in the absence of the support. However, it has now been unexpectedly found that when one utilizes as a catalyst support material metal oxides exhibiting appreciable oxygen-ion mobilities at the gas reaction temperatures, for example, oxygen-ion conducting electrolytes such as yttria-stabilized-zirconia (YSZ) as supports, two additional pathways for producing effective catalytic oxidation reactions with exhaust gas pollutants are advantageously made possible.

As a first pathway, the oxidation reactions can occur on the surface of the oxygen-ion conducting support material even in the absence of the active metal crystallites. The reaction rate is usually small when compared to reactions on the active metal surface at the reaction temperatures of interest in combustion exhaust gas after-treatment processes.

The second pathway for oxidation reactions, which can be referred to as interfacial oxidation, involves oxygen transfer at the three-phase interface between the metal crystallites, the support material and the gas phase. If the rates of the interfacial oxygen transfer reactions are comparable to the rates of the heterogeneous oxidation reaction occurring on the metal crystallites, then the catalyst active metal dispersed on the oxygen-ion conducting support would exhibit an appreciably larger activity towards the oxidation reaction than does the same catalyst active metal dispersed on an inert support material. For the same amount of active metal loading in a catalyst, the smaller the crystallite size the larger will be the surface area for interfacial oxidation reactions.

Catalyst Preparation Method

The high surface area oxygen-ion conducting yttria-stabilized-zirconia (YSZ) support materials of this invention can be prepared by either a sol-gel technique using alkoxides of the elements, or by a microemulsion technique using salt solutions. Useful concentration of yttria ($Y_2O_3$) on zirconia support can be within the range of 1 to 50 wt. %, and is preferably 6–20 wt. % of the support. Use of YSZ-coated support material such as $\gamma$-alumina can serve the same purpose. High surface area supports of YSZ-coated $\gamma$-alumina can be prepared by microemulsion technique using solutions of yttrium, zirconium, aluminum, and ammonium salts. Surface area of the support material may vary between 20 to 300 $m^2/gm$. Active metals such as platinum (Pt) and rhodium (Rh) can be deposited on the YSZ support surface by usual impregnation procedure using aqueous solutions of hydrochloroplatinic acid and rhodium chloride. The prepared catalyst is reduced by contact with hydrogen and then calcined. To prepare a commercial catalytic converter for automobile internal combustion engine exhaust gas treatment, a ceramic honey-comb support structure can be coated with YSZ-support material, which in turn can be deposited with active precious metals such as platinum (Pt) and rhodium (Rh) or palladium (Pd) and rhodium (Rd) in overall or total concentration of 0.01 to 2.2 wt. % of the catalyst.

The invention will be further described by the following examples, which present the catalyst composition and reaction conditions used and pollutant conversion data results obtained, and should not be construed as limiting the scope of this invention.

Our experimental work, as presented in the Examples below, has shown that YSZ-supported active metal catalysts are much more active towards pollutants of CO, $H_2$, $NO_x$ and hydrocarbons removal than those catalysts having active metals support on $\gamma$-alumina alone. This superior activity of YSZ-supported catalysts can be realized even at low loading of the active metals on the support material. In the experiments, yttria-stabilized-zirconia (YSZ) powder having 45 $m^2/gm$ surface area and containing 12 wt. % yttria ($Y_2O_3$), and $\gamma$-alumina having 90 $m^2/gm$ surface area were used as support materials. Both the YSZ and $\gamma$-alumina supports were deposited with the active metals platinum (Pt) and rhodium (Rh) by usual impregnation procedures using aqueous solutions of hydrochloroplatinic acid and rhodium chloride. The metal impregnated supports were then dried, treated with hydrogen and calcined.

Reaction kinetic experiments were conducted with these prepared catalysts samples in a small continuous flow reactor at reaction temperatures of 425° C., 400° C. and 300° C. using a gas mixture simulating automobile exhaust gases, containing 2 V % CO, 0.7 V % $H_2$, 10 V % $CO_2$, 0.2 V % NO, 0.1 V % propylene hydrocarbon, 2.5 V % $H_2O$, and the remainder being nitrogen.

EXAMPLE 1

Catalysts #5 and #11 had 0.02 wt. % platinum (Pt) and Rh/Pt ratio of 0.05 deposited on supports of $\gamma$-alumina and yttria-stabilized-zirconia (YSZ), respectively. The amount of catalyst used in each reactor was 0.01 gm. Total gas mixture flow rate was 200 ml/min and the stoichiometric amount of oxygen was used. Reaction results are presented in the following Table 1, in which HC conversion represents propylene hydrocarbon conversion.

TABLE 1

|  | Catalyst | |
| --- | --- | --- |
|  | No. 5 | No. 11 |
| Support Material | $\gamma$-alumina | YSZ |
| Reaction Temp., °C. | 425 | 425 |
| CO Conversion, V % | 28.1 | 93.5 |
| $H_2$ Conversion, V % | 41.9 | 100 |
| NO Conversion, V % | 92 | >95 |
| HC Conversion, V % | >90 | >90 |

It is noted that the precent conversion of CO, $H_2$ and NO at 425° C. reaction temperature is substantially greater for the No. 11 catalyst having the YSZ-support than for the $\gamma$-alumina supported catalyst, while the hydrocarbon conversion was unchanged at >90 V %.

EXAMPLE 2

Catalysts #1 and #7 used in these experiments had 0.1 wt. % platinum (Pt) and Rh/Pt ratio of 0.05 deposited on $\gamma$-alumina and on YSZ support materials, respectively. Amount of catalyst used in each reactor was again 0.01 gm. Total gas mixture flow rate was 100 ml/min and the stoichiometric amount of oxygen was used. Results are presented in the following Table 2.

TABLE 2

|  | Catalyst | |
| --- | --- | --- |
|  | No. 1 | No. 7 |
| Support Material | $\gamma$-alumina | YSZ |
| Reaction Temp., °C. | 400 | 400 |
| CO Conversion, V % | 0 | 56.6 |
| $H_2$ Conversion, V % | 36.1 | 72.3 |
| NO Conversion, V % | 84.3 | >95 |
| HC Conversion, V % | >90 | >90 |

It is seen that the percent conversion of CO, $H_2$ and NO at 400° C. reaction temperature and the lower gas flow rate of 100 ml/min is significantly greater for the YSZ-supported catalyst No. 7, and the hydrocarbon conversion exceeded 90 V % for each catalyst and its support material.

EXAMPLE 3

Catalysts #5 and #11, as described above in Example 1, were used in this experiment. The amount of catalyst used in each reactor was increased to 0.1 gm. Feed gas mixture composition was changed slightly to 1.8 V % CO, 0.7 V % $H_2$, 0.1 V % propylene, 10 V % $CO_2$ and the remainder was nitrogen. Total gas mixture flow rate was 100 ml/min, the oxygen used was slightly above the stoichiometric amount, and the reaction temperature was reduced to 300° C. Results are presented in the following Table 3.

TABLE 3

|  | Catalyst | |
| --- | --- | --- |
|  | No. 5 | No. 11 |
| Support Material | -alumina | YSZ |
| Reaction Temp., °C. | 300 | 300 |
| CO Conversion, V % | 16.6 | 98.8 |
| $H_2$ Conversion, V % | 42.9 | 100 |
| HC Conversion, V % | 0 | 100 |

It is again seen that the conversion of CO, $H_2$ and hydrocarbons is significantly greater for the catalyst No. 11 having YSZ-support than for the catalyst No. 5 having γ-alumina support.

Thus, the above examples 1-3 demonstrate that YSZ-supported catalysts are far superior to γ-alumina supported catalysts containing the same amount of active metals in terms of conversion of gas emission pollutants CO, $H_2$, NO and hydrocarbons. The superiority of YSZ-supported catalysts is evident even at low loading of active metals of 0.02 wt. % platinum (Pt) on the support, and at low reaction temperatures of 300° C.

Although this invention has been disclosed broadly and in terms of preferred embodiments, it will be understood that modifications and variations can be made within the scope of the invention as defined by the following claims.

We claim:

1. A three-way supported catalyst for treatment of combustion gas emissions from mobile or stationary sources, comprising: an oxygen-ion conducting support material having surface area at least about 20 m$^2$/gm, and two active metals selected from the group consisting of (1) platinum and rhodium and (2) palladium and rhodium dispersed on the support material in overall amount of about 0.01-2.2 wt. % of the catalyst.

2. The catalyst of claim 1, wherein the oxygen-ion conducting support material is yttria-stabilized-zirconia (YSZ).

3. The catalyst of claim 2, wherein the percentage of yttria on zirconia is in the range of 1 to 50 wt. % of the support material.

4. The catalyst of claim 2, wherein the percentage of yttria on zirconia is in the range of 6-20 wt. % of the support material.

5. The catalyst of claim 1, wherein the support material is a high surface area catalyst support material coated with at least 0.1 wt. % yttria-stabilized-zirconia (YSZ).

6. The catalyst of claim 5, wherein the percentage of yttria-stabilized-zirconia (YSZ) on the support material ranges from 5 to 80 wt. % of the support material.

7. The catalyst of claim 1, wherein the concentration of the active metals platinum (Pt) or palladium (Pd) is in the range of 0.01 to 2 wt. % of the catalyst, and Rh/Pt or Rh/Pd weight ratio is in the range of 0.01 to 0.1.

8. The catalyst of claim 1, wherein cerium oxide or lanthanum oxide is added to the support material to act as a stabilizer material.

9. The catalyst of claim 1, wherein the support material has a surface area of 40-300 m$^2$/gm.

10. The catalyst of claim 1, wherein the active metals are platinum (Pt) and rhodium (Rh), the concentration of platinum is 0.01 to 2 wt. % of the catalyst, and the Rh/Pt weight ratio varies between 0.01 to 0.1.

11. The catalyst of claim 1, wherein the active metals are palladium (Pd) and rhodium (Rh), the concentration of palladium is 0.01 to 2.0 wt. % of the catalyst, and the Rh/Pt ratio varies between 0.01 to 0.1.

12. A three-way supported catalyst for treatment of combustion gas emissions from mobile or stationary sources, comprising an oxygen-ion conducting support material composed of yttria-stabilized-zirconia (YSZ) and having surface area at least about 20 m$^2$/gm, and two active metals selected from the group consisting of (1) platinum and rhodium and (2) palladium and rhodium dispersed on the support material in overall amount of 0.01 to 2.2 wt. % of the catalyst.

* * * * *